US005113351A

United States Patent [19]

Bostic

[11] Patent Number: 5,113,351

[45] Date of Patent: May 12, 1992

[54] AUTOMATED, INTERACTIVE VENDING SYSTEM FOR PRODUCTS WHICH MUST BE PROCESSED

[75] Inventor: Steve Bostic, Atlanta, Ga.

[73] Assignee: Delphi Technology, Inc., Atlanta, Ga.

[21] Appl. No.: 330,112

[22] Filed: Mar. 29, 1989

[51] Int. Cl.[5] .............................................. G06F 15/20

[52] U.S. Cl. .................................. 364/479; 235/381; 340/825.35

[58] Field of Search ............... 364/479, 478, 401-403; 235/381, 382, 383, 385, 375; 340/825.35; 358/909

[56] References Cited

U.S. PATENT DOCUMENTS

| | | | |
|---|---|---|---|
| Re. 30,773 | 10/1981 | Glaser et al. | 235/379 |
| 1,244,889 | 10/1917 | Patterson | 221/2 |
| 3,166,214 | 1/1965 | Stevens et al. | 221/4 |
| 3,258,153 | 6/1966 | Morgan et al. | 221/3 |
| 3,372,816 | 3/1968 | Atwater | 414/273 |
| 3,379,295 | 4/1968 | Varley | 194/205 |
| 3,394,798 | 7/1968 | Sako | 206/56 |
| 3,490,616 | 1/1970 | Castaldi | 414/273 |
| 3,504,808 | 4/1970 | Carabateas | 414/273 |
| 3,556,342 | 1/1971 | Guarr | 221/2 |
| 3,563,395 | 2/1971 | Gary | 198/38 |
| 3,697,680 | 10/1972 | Anstin | 178/6.8 |

FOREIGN PATENT DOCUMENTS

| | | |
|---|---|---|
| 0191636 | 8/1986 | Canada . |
| 83109847.0 | 10/1983 | European Pat. Off. . |
| 87301311.4 | 2/1987 | European Pat. Off. . |
| 0249367 | 12/1987 | European Pat. Off. . |
| 0184527 | 6/1986 | France . |
| WO86/02758 | 5/1986 | PCT Int'l Appl. . |
| WO86/04173 | 7/1986 | PCT Int'l Appl. . |
| WO86/06050 | 10/1986 | PCT Int'l Appl. . |
| 8518483 | 7/1985 | United Kingdom . |
| 8624291 | 10/1986 | United Kingdom . |

(List continued on next page.)

OTHER PUBLICATIONS

Product literature concerning the Standard Manufacturing Twilight 135 system; date unknown.

Product literature concerning various products of Canon, Inc., date unknown.

*Primary Examiner*—Joseph Ruggiero
*Attorney, Agent, or Firm*—Kilpatrick & Cody

[57] ABSTRACT

An automated, interactive system for receiving, storing, processing, retrieving and dispensing film, still video camera diskettes, or other products which must be processed. The system includes an unmanned, automated and computerized apparatus analogous to an automatic teller machine (ATM). Instructions presented on an interactive video display prompt a patron to enter identification information and data concerning the type of photoprocessing desired. The information entered is stored on a floppy computer disc or transmitted electronically to a remote processing facility via a telephone link and used to track the order as it is processed at a remote location. The finished prints are returned to the apparatus and stored in a compartmentalized storage unit while awaiting pick-up by the customer. A random access retrieval mechanism included in the apparatus allows packages of processed prints to be stored in any empty compartments of the storage unit.

An alternative embodiment of the present invention integrates an unmanned, automated film processing system with the apparatus described above, eliminating all human handling of the film once it is deposited by the patron. The self-contained, automated system of this embodiment accepts the film products and information concerning the customer and the order, opens the film cartridge, processes the negatives (or transmits information concerning a still video camera diskette to appropriate optics) and prints, cuts and packages the processed products, determines the fee for the processing and returns the package to the storage unit.

17 Claims, 7 Drawing Sheets

U.S PATENT DOCUMENTS

| | | | |
|---|---|---|---|
| 3,732,546 | 5/1973 | Ronkin et al. | 364/900 |
| 3,752,312 | 8/1973 | Soltanoff | 40/6 |
| 3,757,037 | 7/1973 | Bialek | 358/102 |
| 3,780,907 | 12/1973 | Colburn et al. | 221/2 |
| 3,840,103 | 10/1974 | Willis | 194/205 |
| 3,871,156 | 3/1975 | Koenig et al. | 221/2 |
| 3,878,967 | 4/1975 | Joslin et al. | 221/88 |
| 3,917,045 | 11/1975 | Williams et al. | 221/15 |
| 3,947,817 | 3/1976 | Requa et al. | 382/59 |
| 3,958,102 | 5/1976 | Burt | 235/381 |
| 3,964,577 | 6/1976 | Bengtsson | 414/273 |
| 4,136,821 | 1/1979 | Sugiura et al. | 235/462 |
| 4,282,575 | 8/1981 | Hoskinson et al. | 364/479 |
| 4,348,152 | 9/1982 | Takamatsu | 414/785 |
| 4,389,157 | 6/1983 | Bernard, II et al. | 414/787 |
| 4,414,467 | 11/1983 | Gould et al. | 235/381 |
| 4,458,802 | 7/1984 | Maciver et al. | 235/381 |
| 4,519,522 | 5/1985 | McElwee | 221/13 |
| 4,546,901 | 10/1985 | Buttarazzi | 221/10 |
| 4,563,120 | 1/1986 | Josserand | 414/273 |
| 4,567,359 | 1/1986 | Lockwood | 235/381 |
| 4,573,271 | 3/1986 | Hamilton et al. | 901/45 |
| 4,598,810 | 7/1986 | Shore et al. | 194/205 |
| 4,650,977 | 3/1987 | Couch | 235/379 |
| 4,668,150 | 5/1987 | Blumberg | 414/273 |
| 4,712,909 | 12/1987 | Oshikoshi | 354/109 X |
| 4,734,005 | 3/1988 | Blumberg | 414/273 |
| 4,858,743 | 8/1989 | Paraskevakos et al. | 194/205 |
| 4,903,815 | 2/1990 | Hirschfeld et al. | 194/205 |
| 4,951,308 | 8/1990 | Bishop et al. | 379/91 |
| 4,954,697 | 7/1990 | Kokobun et al. | 235/381 |
| 4,961,407 | 10/1990 | Higgins | 221/129 |
| 4,974,096 | 11/1990 | Wash | 354/76 |
| 4,995,498 | 2/1991 | Menke | 194/205 |
| 4,997,076 | 3/1991 | Hirschfeld et al. | 194/212 |
| 5,006,996 | 4/1991 | Nakamura et al. | 364/478 |
| 5,013,897 | 5/1991 | Harman et al. | 235/381 |

AUTOMATED, INTERACTIVE VENDING SYSTEM FOR PRODUCTS WHICH MUST BE PROCESSED

This invention relates to an automated, interactive system for receiving, storing, processing, retrieving and dispensing film or other products which must be processed.

BACKGROUND OF THE INVENTION

The dramatic growth of the popularity of amateur photography over the past two decades has resulted in a substantial increase in the number and kind of merchants involved in and interested in being involved in photoprocessing. Whereas previously available processing options were limited to those provided by photographic specialty stores and mail-order facilities, more recently grocery and drug stores and other mass merchandisers affiliated with central processing laboratories have begun to offer such services as well. In addition, "one-hour mini-lab" facilities using relatively new and sophisticated processing equipment have commenced soliciting customers directly. The advent of this sophisticated processing technology also has decreased the start-to-finish time for most print photoprocessing to approximately forty minutes, significantly less than was previously required.

Even though modern technology has minimized the actual time needed for processing certain photographic products (i.e. "one-hour" pictures), the total period from exposure of the last frame of a roll of film until retrieval of the finished prints frequently remains much longer. Each of the above-mentioned systems suffers from a flaw which contributes to the overall delay in obtaining the completed products in that none operates entirely at the convenience of the consumer. Mail-order photoprocessing, for example, depends upon the postal system for transmitting the goods to and from the processing laboratory. Consequently, a patron depositing his film must await the next postal collection and wait for the mail to arrive at and return from the facility and be delivered to him. Depositing the film at "one-hour" processing laboratories, where the processing is completed on the premises, eliminates the need to use the postal system. However, the customer remains subject to the operating hours of the store. If the facility is closed when the patron desires to deposit his film for processing, he has no alternative but to wait until it next is open.

While grocery and drug stores which are open twenty-four-hours per day cure the problem of timely access to the deposit and retrieval location, the associated processing systems are not without problems either. In most stores, a customer (or a sales clerk) merely prints personal and processing information on the exterior of an envelope, places the film in it and drops the envelope into a sealed container for later collection or leaves it with the clerk. To obtain the processed pictures, however, the customer must locate a sales clerk who must in turn locate the finished pictures and collect payment in exchange for the prints. Maintaining a clerk present at all hours greatly increases the overall cost of the photofinishing system and results in a substantially reduced profit to the service provider. The customer frequently also must provide an identification means, such as a claim check or receipt, so that the clerk can visually determine that the person receiving the prints is the one whose name appears on the deposit envelope.

In an effort to solve these problems and provide a faster and more efficient method of handling the film, the industry has begun developing automated deposit and retrieval devices analogous to automated teller machines (ATMs) used widely by the banking trade. One such photographic vending and dispensing system, disclosed in European Patent Application Number 87301311.4 (publication number 0 234 833) filed by Sabbagh, includes a freestanding, computerized apparatus which accepts a customer's credit card along with film to be processed. Once the processing (accomplished at another location) is complete the film and prints are deposited in the apparatus to await the customer's return. To obtain the processed products the customer inserts his credit card for identification and payment purposes. At no time must the customer locate and confront a human store clerk to obtain the finished goods.

Even though the interface with the customer disclosed in Sabbagh is completely automated, humans continue to perform two significant functions during the handling of the film. Initially, someone must collect the undeveloped film, transport it to the remote processing laboratory, and, to the extent the processing operation itself is not fully automated, participate in the developing procedure. Significantly, the Sabbagh application discloses no means by which to track the film through the processing laboratory and thereby avoid errors in matching the processed film with the intended recipient. In addition, after processing the person returning the finished products to the vending apparatus must manually insert each package into its matching compartment. Once all of the packages are inserted into compartments bar codes on each package are optically read. If one or more packages are inserted into improper compartments they are ejected from the apparatus, forcing the operator to reinsert them properly. Thus, it appears that a single error early in the insertion effort would result in virtually all of the packages being rejected and would require substantial effort to correct.

SUMMARY OF THE INVENTION

The present invention is an automated, interactive vending station which accepts objects to be processed (such as undeveloped film or still video camera diskettes) and information provided by customers, prepares computerized records of the information received from the customers and stores the film in an individualized container, such as a labeled envelope, for subsequent processing at a remote laboratory. The vending station stores the developed film and processed products in a randomly accessible medium as mentioned above and provides means by which the film can be retrieved and dispensed to the customer upon presentation of information matching that provided at the time of deposit. The station also accepts payment by cash, check or credit card, provides printed receipts and change if appropriate, dispenses fresh film and allows two-way communication with a representative of the processing facility at the remote location. The link between the apparatus and the laboratory also may be used to transmit information concerning the order, including data stored on the still video camera diskette, directly for processing, and allows the customer service representative to operate the apparatus from the remote location.

The system of the present invention avoids many of the problems of the Sabbagh device by including features making it easier and more convenient to operate. For example, customers utilizing the present system need not display a credit card before the order can be processed; rather, patrons retain the option of paying in other manners and either before or after the order is completed. An interactive video mechanism with a touch-sensitive screen prompts the user to enter identity and processing information and provides an easy means for the customer to input data into the computerized system. Use of computerized records of customer-provided information to track the film through the processing laboratory is critically important in minimizing errors in matching the order to the intended recipient and providing a database of information about the types, volume and locations of photoprocessing requests, fresh film purchased and other data from a network of vending stations. This information will permit virtually immediate adjustment of operation of the vending station and processing facility network in order to optimize its operation. Finally, the use of randomly accessible print storage eliminates the troublesome requirement of matching finished prints to particular compartments. Instead, the person returning the products to the vending apparatus merely places the packages in any empty compartments; when the customer returns for the finished goods the retrieval system will locate the correct compartment automatically.

In an alternative embodiment of the present invention, an unmanned automated photoprocessing system is integrated with the vending station. Previously exposed film deposited at the vending station is removed from its light-resistant enclosure and transported to the automated processor where it is placed in appropriate chemical solutions to develop the negative pictures. Prints are made from the negatives and both the prints and the negatives are cut to selected dimensions for packaging together in an individualized container. Cost calculations are made and the package of prints and negatives is delivered to the randomly accessible storage medium within the vending station to be dispensed to the patron upon presentation of information matching that provided with the processing order. Still video camera diskettes likewise may be deposited in the vending station and prints obtained using additional processing equipment integrated with the system. Connecting a mechanized processor directly to the vending station completely automates the system, thereby eliminating all errors associated with human handling of the products. Such a system also minimizes the time the customer must wait for the finished pictures by avoiding the delay caused by transporting the film to and from a remote laboratory and the need to locate and confront a sales clerk to obtain the prints and effect payment.

It is therefore an object of the invention to provide an automated system which interacts with the customer in order to obtain information unique to a particular patron and which accepts and stores undeveloped film, still video camera diskettes, or other products for processing.

It is an additional object of the invention to provide an automated system which tracks each processing order using the data provided by the patron and includes a link between a vending apparatus and a remote laboratory allowing two-way voice or digital communication.

It is another object of the invention to provide an automated system which includes a storage mechanism for the developed film and prints and a random access retrieval means for locating the stored products when information matching that provided by a particular customer prior to processing is reentered into the system.

It is a further object of the invention to provide an automated system which dispenses fresh film upon request and which accepts various forms of payment including cash, checks and credit cards and provides a printed receipt and change, if appropriate.

It is an object of an alternative embodiment of the present invention to provide an automated processing system integrated with the vending station, thereby avoiding the necessity of any human involvement in the processing of the product.

It is a further object of the alternative embodiment to provide an automated processing system including means for removing undeveloped film from its light-resistant container and developing it.

It is an additional object of the embodiment to provide an automated processing system further including mechanisms for making prints from the negatives or from information obtained from still video camera diskettes.

It is yet another object of the embodiment to provide an automated processing system additionally including means for packaging the negatives and prints and transmitting the package to the random access storage means.

Other features and objects of the invention will become apparent from reference to the detailed description of the embodiments and the accompanying drawings.

DETAILED DESCRIPTION OF THE DRAWINGS

Remote Processing Embodiment

1. Operations

Figure 1:
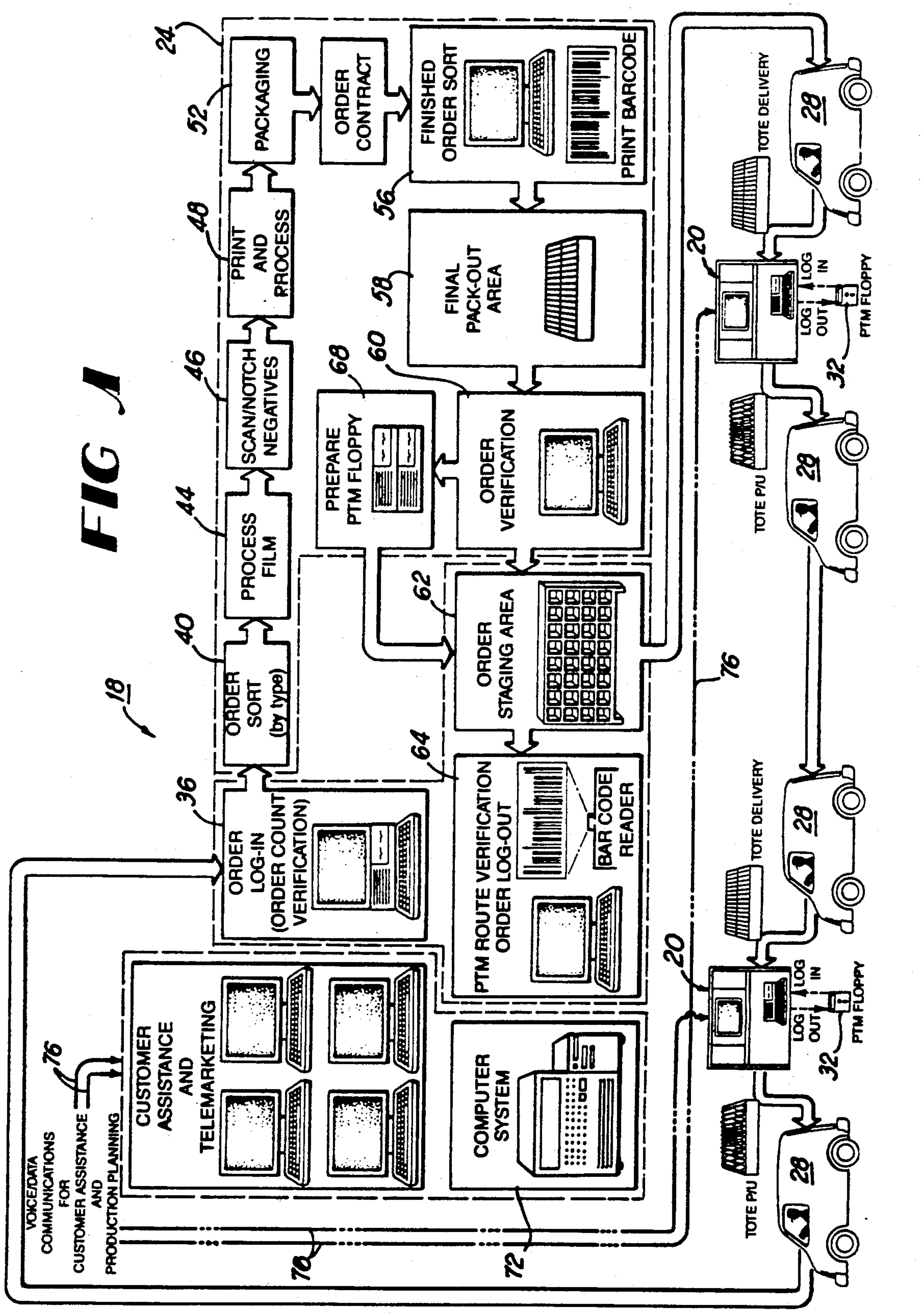
FIG. 1 is a schematic diagram of a first embodiment of the film processing system of the present invention showing the interaction between the vending apparatus and the remote processing laboratory.

FIG. 1 illustrates schematically a first embodiment of the receiving, processing and dispensing system 18 of the present invention. System 18 includes vending apparatus 20, processing center 24 and collection and delivery means 28. Patrons desiring to have film, still video camera diskettes, or other appropriate products processed deposit their items in apparatus 20. Periodically the deposited items of various customers are collected from apparatus 20 and transported to a remote laboratory 24 via any appropriate means 28, such as a delivery truck. The items are processed at center 24 and the processed products are returned to apparatus 20 through means 28 to await retrieval by the patrons.

Tracking of each processing order is accomplished through information contained on a transportable memory medium 32 programmed with data unique to each such order. Alternatively, the information may be transmitted electronically via telephone link 76 directly to the remote laboratory 24 or to some other location, with medium 32 serving merely as a confirmatory source of data. If the apparatus is equipped with a still video cassette reader (element 412 of FIG. 5B), additional information concerning the pictures themselves may be transmitted directly to the laboratory 24 or to other locations for processing or other manipulation. At the time a patron deposits an item for processing in apparatus 20, he is automatically prompted to provide information relating to his identity and to the type of photoprocessing desired. Such information is recorded on medium 32, shown in FIG. 1 as a floppy computer disk which also contains data regarding the location of the apparatus 20, and is used to provide a uniquely-labeled envelope into which the undeveloped film or item may be placed. Both the transportable memory medium 32 and the labeled envelope containing the item are transported to laboratory 24. At laboratory 24, the information stored on medium 32 (or previously transmitted directly via link 76) is matched against the types and numbers of film products collected for processing and the counts are verified at order log-in station 36. Based upon the processing information previously transmitted or contained on medium 32, the products are sorted (block 40) and each film order is developed (block 44). The information transmitted or contained on medium 32 also can be used to compile statistical information regarding the types of services requested and the dates and times of use of each apparatus 20.

Following developing, the negatives are scanned for printing parameters and notched in order to code the order (block 46), the processed film is printed (block 48) and the prints and negatives are packaged together (block 52). Prints obtained from the still video camera diskette similarly are packaged together. Once each order is prepared, it is resorted based upon the location of the apparatus 20 from which it came and a bar code is generated containing information from which the patron's identity, the type of order and the location of the apparatus 20 in which the item was deposited may be derived or obtained (block 56). The orders then are removed to a final pack-out area (block 58) and the information contained on each bar code is verified against that stored on medium 32 to ensure that the appropriate processing has been completed for each request (block 60). The orders subsequently are placed in an order staging area (block 62), the bar codes are again checked to verify the apparatus 20 location to which the orders are to be returned (block 64), and both the finished products and memory medium 32 (made ready to record new order information at block 68) associated with the particular apparatus 20 are returned via transportation means 28 to the apparatus 20. A master computer system 72 controls the tracking and other functions performed by laboratory 24 and telephone link 76 connects patrons with customer service representatives at laboratory 24 should further information or assistance be desired. Customer service personnel also may operate vending apparatus 20 remotely through telephone link 76 if such operation is necessary.

Figure 2:
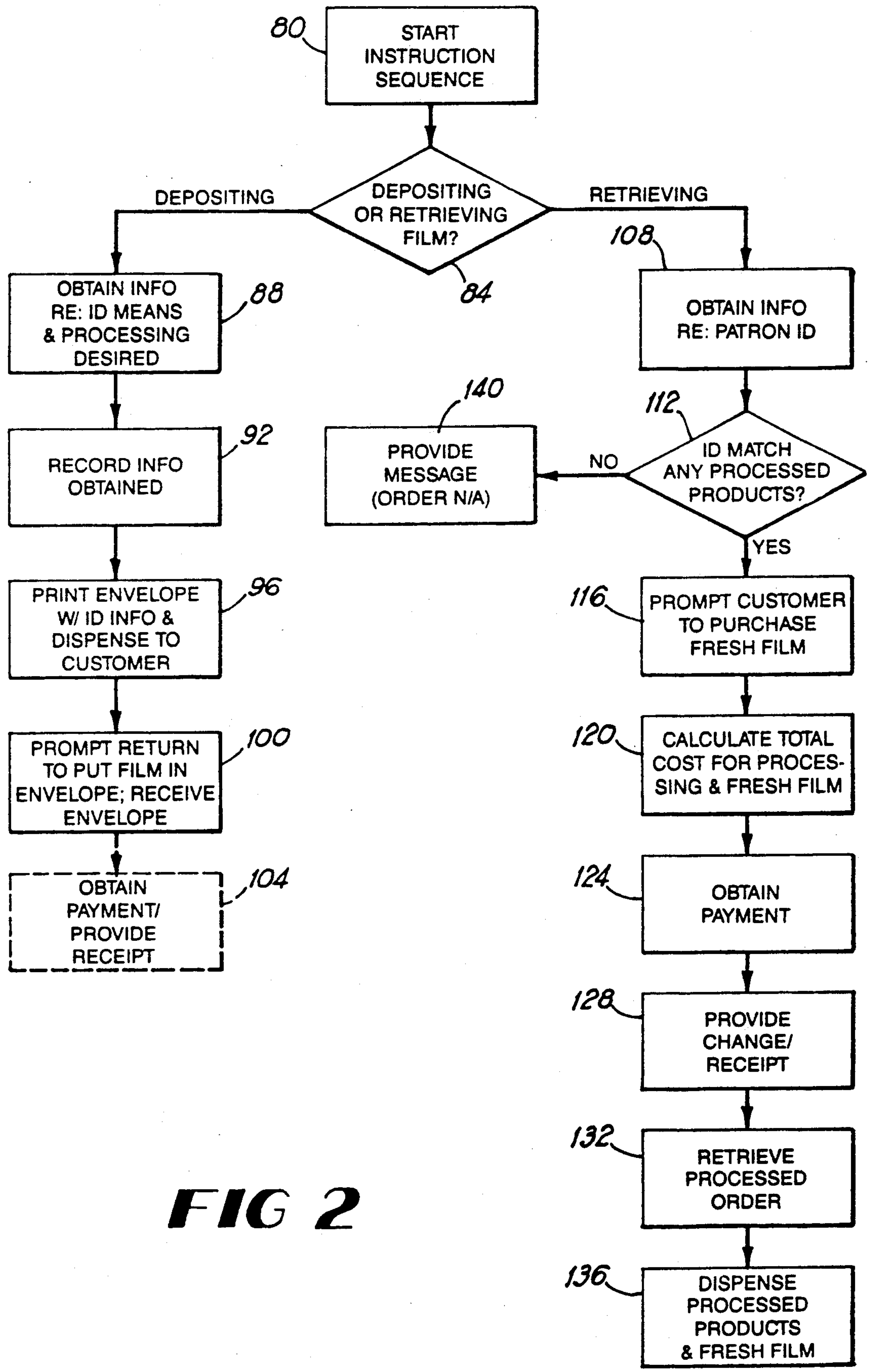
FIG. 2 is a flow chart showing the operation of the vending apparatus of the system shown in FIG. 1.

FIG. 2 details in flow-chart form the various operations performed by vending apparatus 20. Initially, apparatus 20 prompts a patron to begin the instruction sequence (block 80) by performing an act such as pushing a button or, as in the preferred embodiment, touching the appropriate portion of a touch-sensitive video display screen. This and other prompts and information may be provided to a patron audibly or visibly utilizing a cathode ray tube (CRT) display such as component 144 shown in FIG. 3. Apparatus 20 next queries whether the patron is depositing exposed film or other items for developing or retrieving the processed products (block 84). If the patron responds that he wishes to deposit items for developing, the apparatus 20 prompts him to enter information (via a keyboard, the touch-sensitive screen 144, or any other combination of appropriate data entry means) concerning his identity and the type of processing desired (block 88). The information is stored on medium 32 described above (block 92) or transmitted directly to laboratory 24 or both and printed or otherwise encoded upon an envelope or other container which is then dispensed to the patron (block 96). Apparatus 20 prompts the patron to place the undeveloped film or other items to be processed in the labeled envelope 157 (FIG. 3) provided and deposit it into the interior of the apparatus 20 through slot 160 for collection and processing (block 100). Additionally, at this time apparatus 20 can also query the patron as to the type of payment means which would be used and obtain payment if such is required in advance. Prior payment may be preferred in some cases when, for example, a patron indicates that he will pay by check, so that the checking account balance may be verified or the check deposited before processing is performed. Apparatus 20 can also provide a printed receipt 199 at this time (block 104) indicating the amount of payment or film products tendered.

If in response to the initial query (block 84) the customer indicates that he is retrieving processed products, apparatus 20 then prompts him to enter information from which his identity (or authorization to retrieve particular items) may be confirmed (block 108). The information entered is checked against that encoded in the bar codes of the processed packages 220 (FIG. 3B) within apparatus 20 (block 112). If the entered information matches that encoded on a package 220, apparatus 20 confirms that the processing has been completed and queries whether the patron would like to purchase fresh film 208 as well (block 116). The total cost of the order (including any fresh film 208 purchased) then is computed (block 120) and payment, if not already procured, is obtained via cash, check or credit card (block 124). Apparatus 20 then may provide change if appropriate, print a receipt 199 (block 128) and retrieve the processed package 220 containing the appropriately encoded information (block 132). Following these actions the retrieved package 220 and any fresh film 208 purchased is dispensed to the patron (block 136). If the entered information does not match that encoded on any package 220 in apparatus 20, the apparatus may instead provide a message to the patron indicating that such order is not yet available (block 140).

2. Apparatus

Figure 3A:
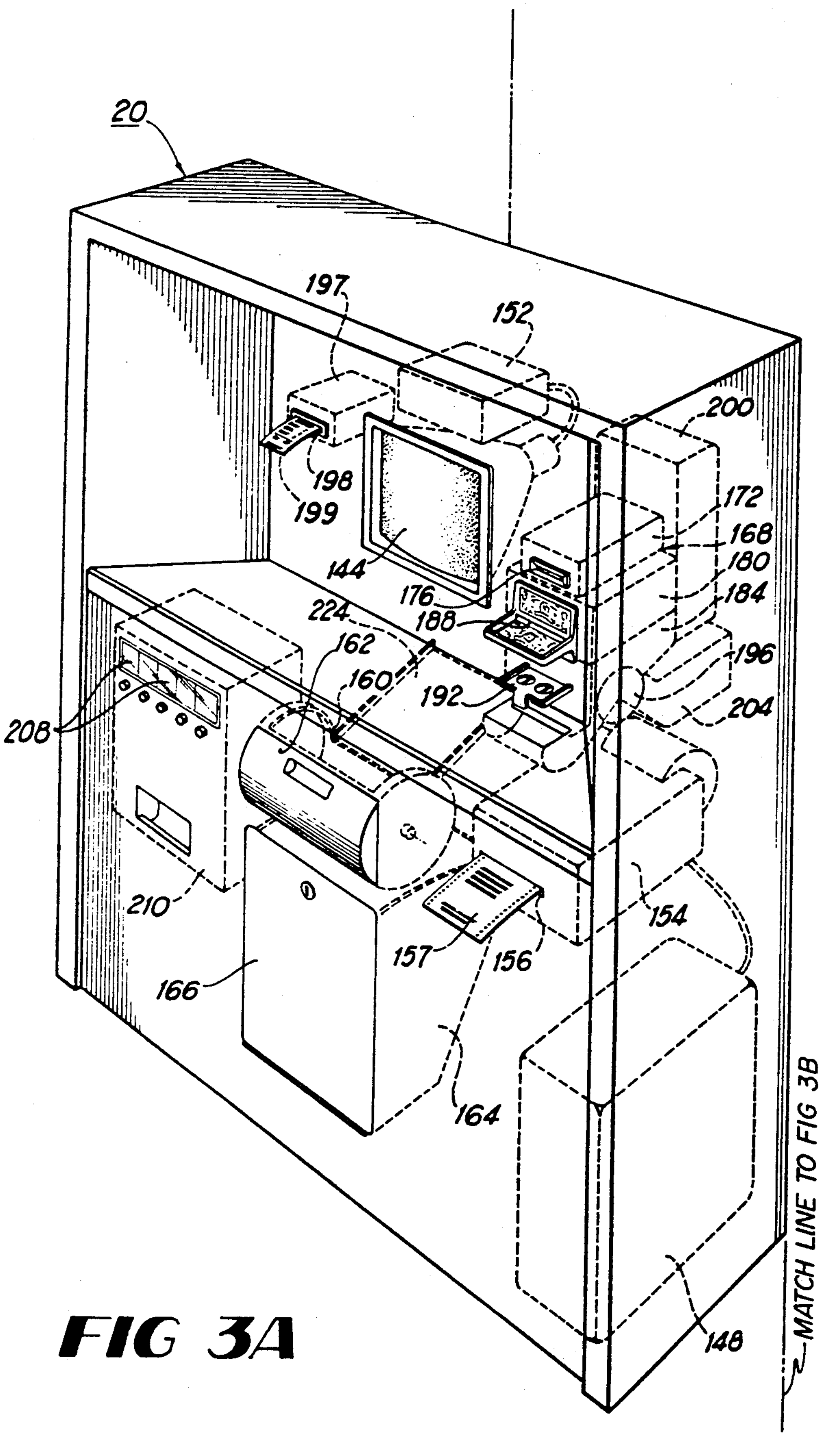
FIG. 3A–3B is an exploded perspective view of the vending apparatus whose operations are shown in FIG. 2.
Figure 3B:
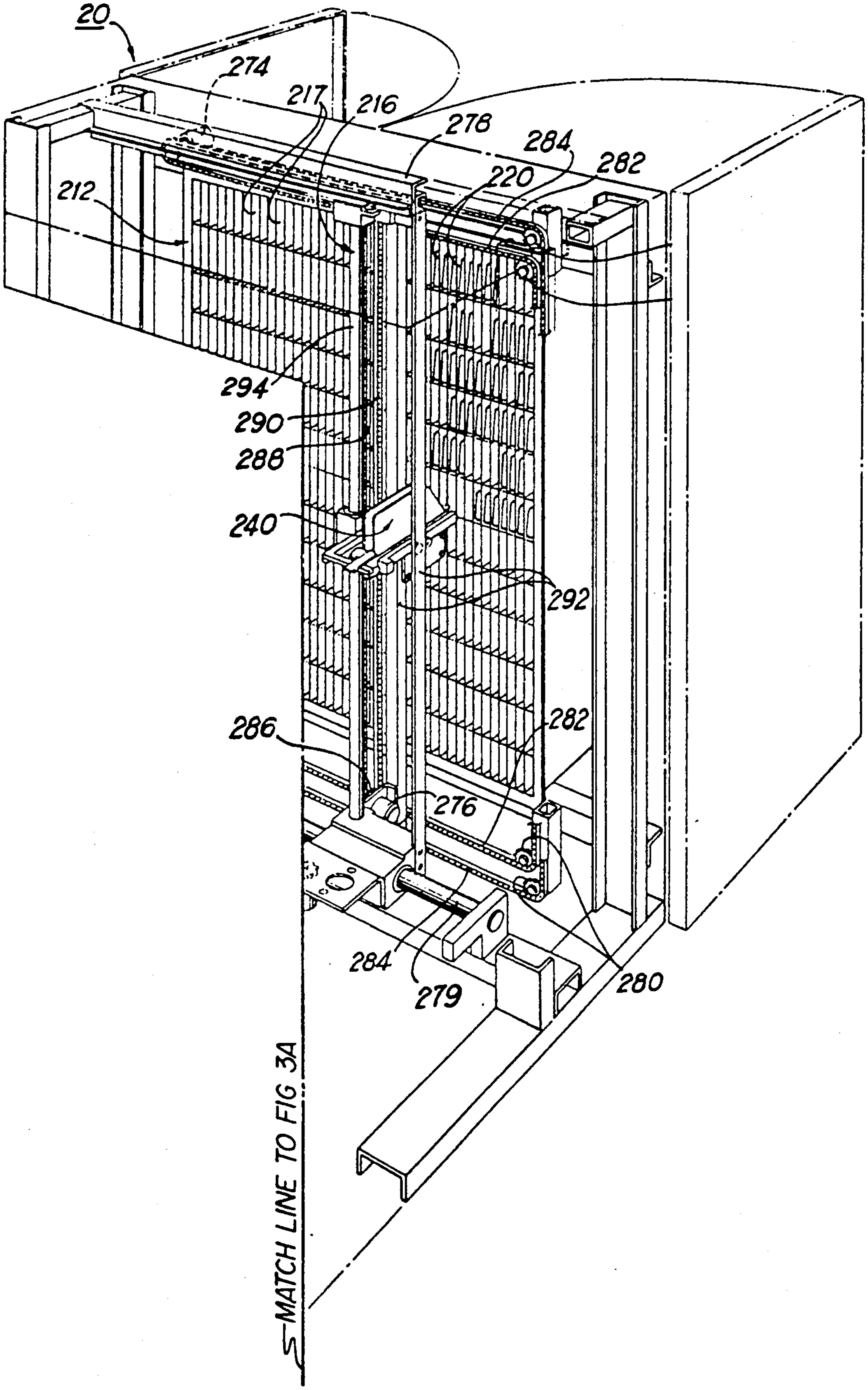

FIG. 3A–B details the vending apparatus 20 of the present invention. Prominently presented to the patron on the front of apparatus 20 is a touch-sensitive video display 144 from which the customer will receive instructions and be requested to respond. Display 144 is controlled by a conventional digital computer 148 acting in combination with a laser-disc player 152. Player 152 through display 144 initially prompts the patron to begin the instruction sequence by touching an appropriate portion of display 144. Subsequent instructions provided through video display 144 frequently are responsive to information previously entered. For example, as shown in block 84 of FIG. 2, the customer is queried whether he desires to deposit or retrieve film. Depending upon the patron's response to this question, the following queries will differ as is appropriate.

A printer 154 controlled by computer 148 is positioned directly behind slot 156 in apparatus 20 for printing information on an envelope 157 as discussed above in conjunction with block 100 of FIG. 2. Slot 160 of rotary drum 162 provides a means by which the customer can deposit his undeveloped film products in storage compartment 164 for processing or retrieve the processed results. Drum 162 containing slot 160 and controlled by computer 148 to open only when the appropriate actions for depositing (or retrieving) film products have been completed will prevent casual deposit of trash or debris in the storage compartment 164. Beneath slot 160 and in front of compartment 164 is collection door 166. The deposited items may be collected for delivery to the processing laboratory 24 by opening door 166 (usually with a key) and removing the film items from the compartment 164.

Also visible to the customer is payment mechanism 168 controlled by computer 148. Mechanism 168 typically is a credit card reader 172 positioned behind slot 176, bill and coin acceptors 180 and 184 positioned behind slots 188 and 192, respectively, and a rotatable change drum 196 having an opening. A customer paying by credit card places the card into reader 172, and the information on the card's magnetic strip is recorded upon memory means 32 or transmitted via link 76 to any facility capable of debiting his account and crediting that of the service provider. Payments in cash are made by placing acceptable combinations of bills and coins into acceptors 180 and 184 respectively. If the computer 148 calculates that excess payment has been made, change may be released from money storage unit 200 into the opening of change drum 196 and the drum rotated so that the change is accessible to the patron. If computer 148 determines that an incorrect amount of change has been released into drum 196, the drum may be rotated so that the change contained therein falls into a miscount box 204. A second computer-controlled printer 197 positioned behind slot 198 prints a receipt 199 for the payment tendered as discussed above in connection with blocks 104 and 128 of FIG. 2.

Also contained within apparatus 20 are packages of fresh film 208 in a storage and dispensing mechanism 210, an additional storage unit 212 and a retrieval mechanism 216 for retrieving containers of processed film 220. Storage and dispensing mechanism 210 may be any standard vending-type mechanism for dispensing products. Should a customer desire to obtain his finished prints 220, retrieval mechanism 216 removes the appropriate products from unit 212 and transports them to the dispensing chute 224. Goods dispensed using chute 224 fall into appropriately-positioned drum 162 from which they may be picked-up by the customer.

Storage unit 212 is divided into stacked rows of compartments 217, each slightly larger than a single container of processed film products 220. When the packages of finished products 220 are returned to the apparatus 20, they may be inserted randomly into compartments of the unit 212. Spacer ribs 218 (FIGS. 4A-D) in each wall of compartments 217 prevent the products 220 from resting against either wall, while spacer 219 in the floor of each compartment 217 similarly precludes product 220 from resting flat against the floor. Although no matching of products 220 to compartments 217 is necessary, some care must be taken to ensure that the bar codes contained on each package (see FIG. 1, block 56) face out so that they may be scanned by optical scanner 232 of mechanism 216. Once products 220 have been inserted into compartments 217 computer 148 through retrieval mechanism 216 causes scanner 232 to scan the bar codes affixed to the packages 220 and transmit the information contained thereon back to computer 148. Computer 148 records the scanned information for each product along with the product's location within unit 212. When a customer desires to retrieve his film products 220 and enters retrieval information as requested in block 108 of FIG. 2, computer 148 compares that information with the stored information. If a match occurs computer 148 causes mechanism 216 to position scoop mechanism 240 adjacent the compartment 217 containing the customer's processed film 220.

Movement of retrieval mechanism 216 is controlled by chain and sprocket systems driven by motors 274 and 276. The mechanism 216 is slidably attached to parallel horizontal track 278 and horizontal linear guide 279 located at the top and bottom of the storage unit 212, respectively. Controlled by appropriate signals from computer 148, motor 274 drives chain segment 282 attached at the top of mechanism 216 and chain segment 284 attached at the bottom of mechanism 216 through sprockets 280, moving mechanism 216 in a horizontal direction. Vertical movement of scoop assembly 240 is caused by a chain and sprocket system connected to motor 276 which, like motor 274, also is controlled by computer 148. Appropriate signals from computer 148 cause motor 276 to drive chain segments 288 and 290 around sprocket 286, causing segments 288 and 290 to move vertically and in opposite directions. Because chain segment 288 is attached to scoop assembly 240, the assembly likewise will travel vertically while guided by vertical tracks 292 and vertical linear guide 29 of the mechanism 216.

Figure 4A:
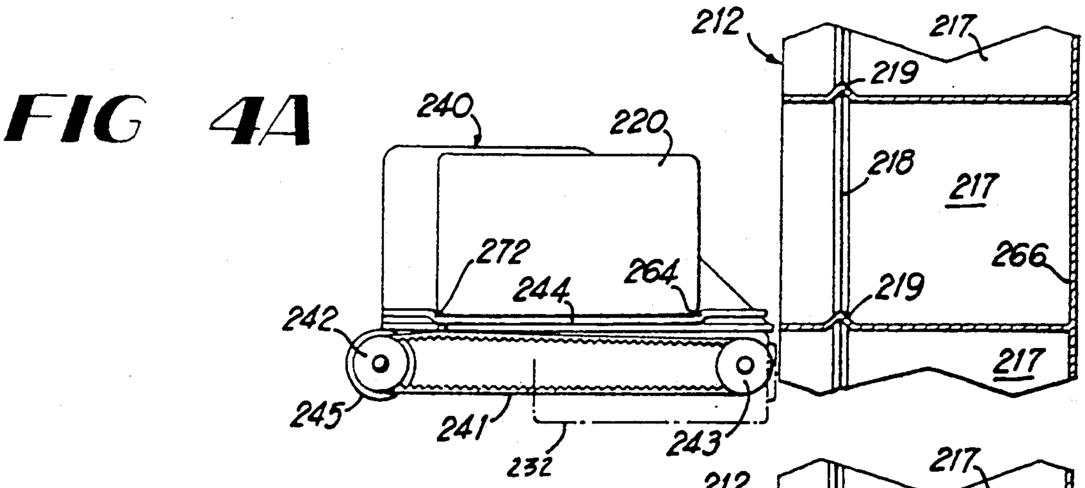
FIGS. 4A–4D are side elevational views of the scoop mechanism of the vending apparatus shown in FIG. 3.
Figure 4B:
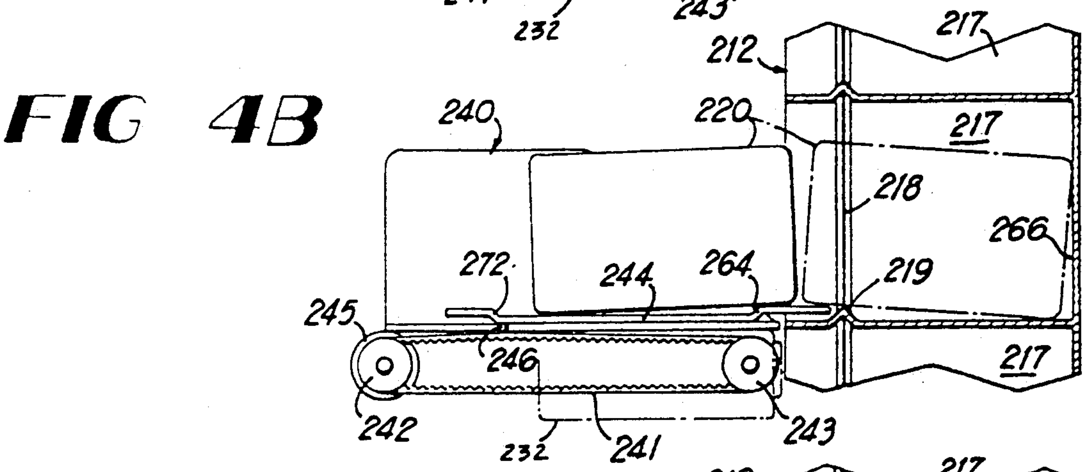
Figure 4C:
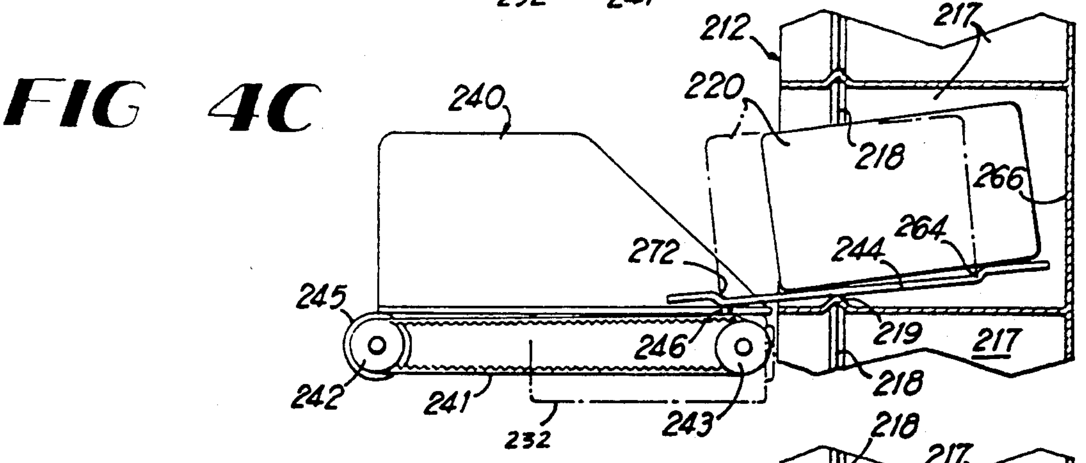
Figure 4D:
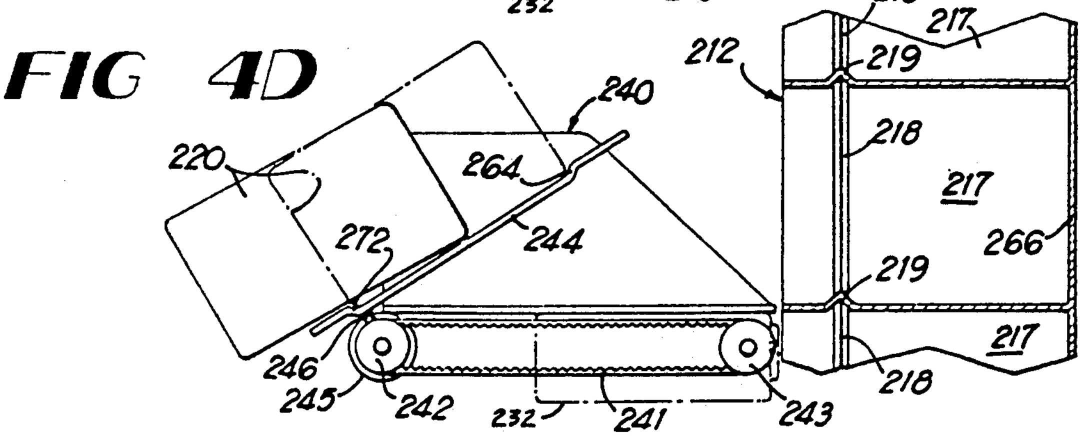

Once a match has occurred, the customer has paid for the processing charges (see FIG. 2, block 124) and mechanisms 216 and 240 are correctly positioned, computer 148 enables scoop mechanism 240 (FIGS. 4B-D). Enabling mechanism 240 drives timing belt 241 positioned on sprockets 242 and 243 via a bidirectional motor 245 and causes scoop tongue 244 attached to belt 241 by a rivet 246 to enter the compartment 217 (FIG. 4B) containing the product 220 having the correct encoded information. Sloped step 264 of scoop tongue 244 passes over floor spacer 219 as tongue 244 enters the compartment 217 (FIG. 4C), lifting tongue 244 slightly and causing product 220 to tilt onto the scoop tongue 244. As tongue 244 moves toward the back wall 266 of compartment 217 the product 220 slides completely onto the tongue 244, with sloped step 264 and rear step 272 precluding the product 220 from sliding out during movement of the mechanism 216. Tongue 244 then retracts from the compartment 217, removing the product 220 at the same time.

After product 220 has been removed, computer 148 signals mechanism 216 to position scoop mechanism 240 opposite dispensing chute 224 (FIG. 3A). Computer 148 again enables scoop mechanism 240, driving timing belt 241 slightly in the direction opposite that described above and moving rivet 246 radially around sprocket 242, thereby causing tongue 244 to pivot upward about sprocket 242 (FIG. 4D). As tongue 244 pivots, product 220 is propelled over rear step 272 and into chute 224 for retrieval by a customer from drum 162.

SELF-CONTAINED PROCESSING EMBODIMENT

Figure 5A:
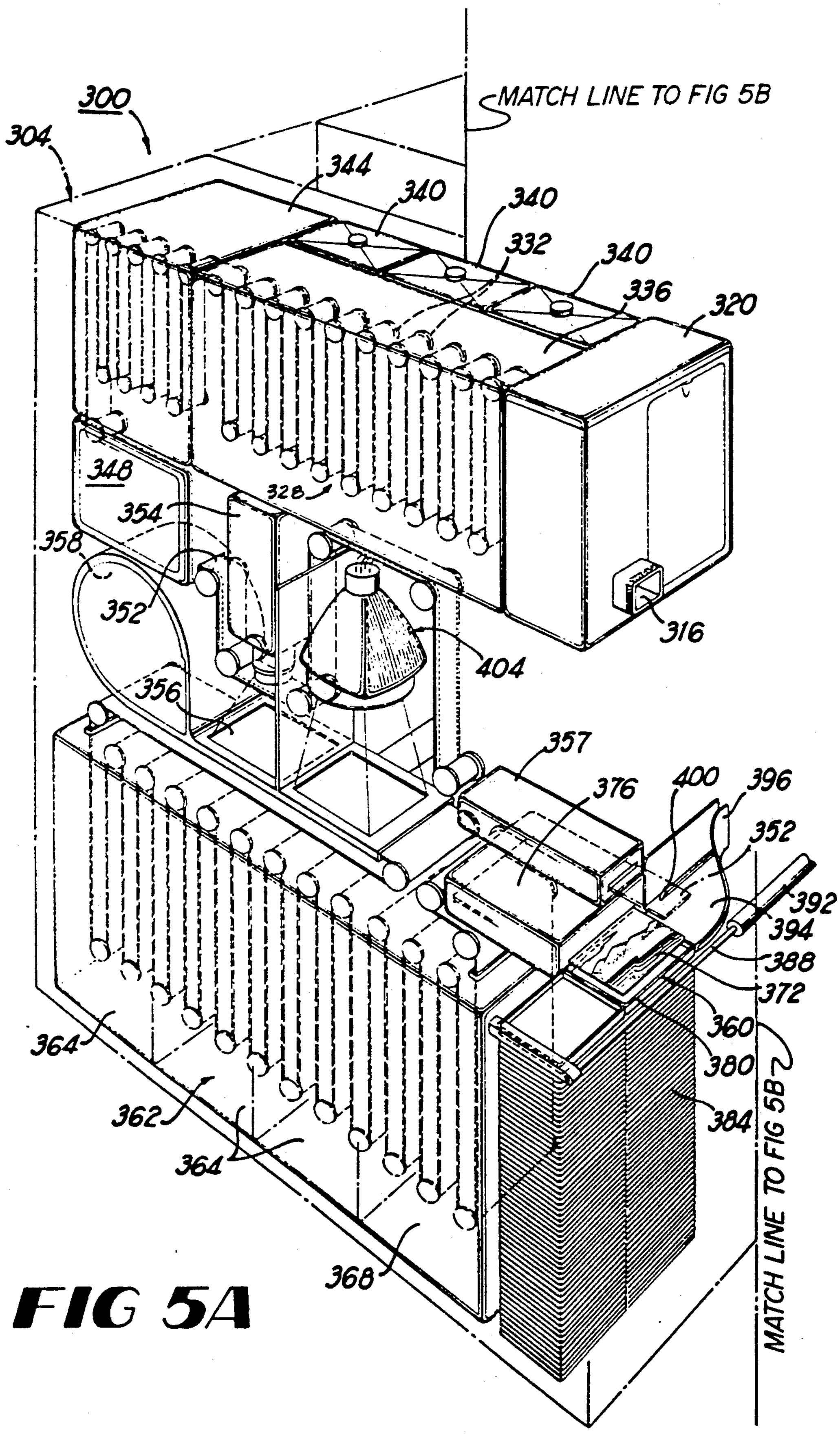
FIG. 5A–5B is an exploded perspective view of an alternate embodiment of the present invention including an automated processor.
Figure 5B:
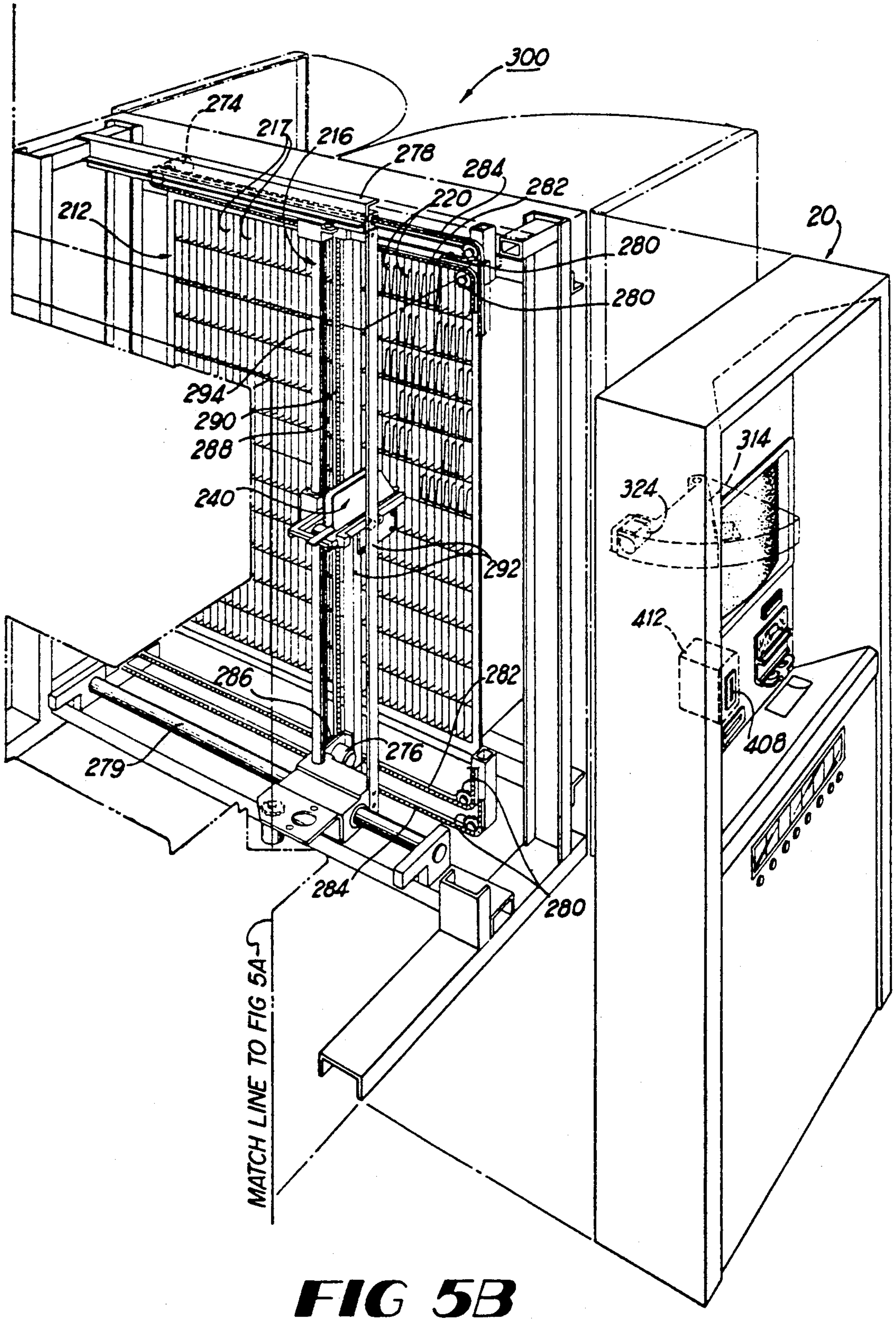

FIG. 5A-B is an exploded perspective view of an alternative self-contained processor system 300 of the present invention. Self-contained system 300 includes an automated film processing system 304 integrated with the apparatus 20 and controlled by a conventional digital computer, completely eliminating the need for direct human involvement in the handling and processing of the deposited items. Utilizing system 300 a patron may begin the deposit sequence as described in blocks 80-92 of FIG. 2 and deposit film products into apparatus 20 through a releasable door 314, a slot, or any other appropriate opening connected to a insertion slot 316 for opener 320. Opener 320 removes the film from its light-resistent cartridge and positions the spool of film 324 on film transport mechanism 328, which includes a series of rollers 332 and a drive motor (not shown), for transport to the automated film processor 336, which includes containers 340 for storing processing chemicals, and dryer 344 for processing of the film 324. A color analyzer 34 determines the optimum printing requirements for each picture of the processed color negatives 352. The negatives 352 subsequently are transported to a film lamphouse 354, which optically projects the image contained on each negative 352 onto light-sensitive paper 356 supplied by paper roll 358 below. From the lamphouse 354 negatives 352 are transported to a film cutter 357 for cutting into standard size rows and to a packaging station 360 for sleeving in a plastic (or other) sleeve.

Similarly, paper 356 containing the projected images is transported to an automated processor 362, containing chemical storage bins 364, and dryer 368 for processing into positive prints 372. The paper 356 containing prints 372 is then conveyed to paper cutter 376 which slices the paper 356 into individual prints, and to packaging station 360, which transmits cost data to the computer and prepares the prints for packaging and labeling with its corresponding negatives 352 in a hinged container 380 supplied by magazine 384. Piston 388 of a computer-controlled cylinder assembly 392 then retracts, engaging the container 380 having the processed products and causing container 380 to close. As piston 388 continues to retract, container 380 is pulled along ramp 394, which is inclined so that container 380 is rotated ninety degrees, into shoe 396 to await storage. Scoop mechanism 240 subsequently is positioned adjacent to and slightly below shoe 396. The computer then actuates mechanical finger 400, which travels along the floor of shoe 396 and pushes container 380 out of shoe 396 and into scoop mechanism 240. The mechanism 240 transports container 380 to the vending portion of the integrated station for storage (as processed packages 220) in storage unit 212, with tongue 244 entering a compartment 217 and decelerating rapidly (FIG. 4A) so that the container will remain in the compartment 217. Those skilled in the art will recognize that a number of cutting, packaging and transport methods may be used which differ from that described above. In particular, the cutting and packaging functions may be performed by a single device manufactured by the Standard Manufacturing Company.

The self-contained processing system 300 disclosed in FIG. 5A also contains a video imaging device 404, which may be a CRT, and associated optics for making prints from still video camera diskettes. Once a customer inserts the diskette into a slot 408 (FIG. 5B) added to the vending apparatus 20, the digital computer causes the information contained on the diskette to be read by a diskette reader 412 included in apparatus 20 and transmitted to the computer for display on video imaging device 404. The images derived from the transmitted information then are projected onto paper 356 supplied by paper roll 358. Paper 356 is conveyed to the automated processor 362 and dryer 368 for processing and transported to paper cutter 376 and packaging station 360 for cutting, packaging, and transporting to scoop mechanism 240 as described above. After being read by reader 412, the diskette may be returned to the customer immediately. In addition, including a communications link similar to link 76 of FIG. 1 allows the information contained on the diskette to be transmitted to remote locations if necessary or desirable.

Automated processing system 300 includes a self-threading system of the type used in a minilab leader tab system. A suitable opener 320 for the film cartridges may be similar to a Standard Manufacturing Company "Twilight 135" automatic system. Color analyzer 348 typically is a light and color sensor of the type used in a "Noritsu 1201" Printer. Lamphouse 354 is a computer-controlled light source and filter arrangement adjusted automatically from information obtained from the color analyzer 348 and is similar to the lamphouse of a "Noritsu 1201" printer. Finally, automated processors 336 and 362 may be rapid access processors, typically type C41, while diskette reader 412 typically is of a type similar to the Canon "RV-301" Still Video Player.

The foregoing is provided for purposes of illustration, explanation and description of a preferred and an alternative embodiment of the invention. Modifications and adaptations to these embodiments will be apparent to those of ordinary skill in the art and they may be made without departing from the scope or spirit of the invention.

What is claimed is:

1. An automated, human responsive apparatus for receiving, storing, retrieving and dispensing an item which must be processed comprising:

a. means for providing instructions concerning processing of the item;
b. means for entering into the apparatus information responsive to the instructions provided;
c. means for receiving the item to be processed;
d. means for storing the item received;
e. means for allowing collection of the item stored for processing;
f. means for retrieving the item processed; and
g. means for dispensing the item retrieved.

2. An apparatus according to claim 1 in which the instruction providing means comprises a video display supplying instructions responsive to the information entered.

3. An apparatus according to claim 1 in which the retrieving means comprises:

a. at least one track connected to the storage means;
b. guide means slidably attached to the track; and
c. a scoop assembly slidably attached to the guide means.

4. An apparatus according to claim 1 further comprising means for recording the information entered.

5. An apparatus according to claim 1 further comprising means for receiving payment for fees charged for processing the item.

6. An apparatus according to claim 1 further comprising means for dispensing a means for identifying the item to be processed bearing symbols derived from the information entered.

7. An apparatus according to claim 1 further comprising means for establishing voice and digital communication between a user and a representative located at a remote location and allowing the representative to operate the apparatus from the remote location.

8. An apparatus according to claim 5 further comprising means for comparing the payment received with the fee charged and refunding any excess payment.

9. An apparatus according to claim 8 further comprising means for printing a receipt for the fee charged, amount received and excess refunded.

10. An automated, human responsive apparatus for receiving, storing, retrieving and dispensing an item which must be processed comprising:

a. means for providing instructions concerning processing of the item;
b. means for entering into the apparatus both before and after processing of the item information responsive to the instructions provided;
c. means for recording the information entered;
d. means for receiving the item;
e. storage means for storing the item received;
f. means for allowing collection of the item stored for processing;
g. means for retrieving the item processed comprising:
   1. compartmentalized storage means for storing in any empty compartment the item after processing;
   2. means for scanning information relating to the processed item and to a user of the apparatus; and
   3. means for matching the scanned information with the information entered by the user after processing of the item to be processed; and
h. means for dispensing the retrieved item.

11. An apparatus according to claim 10 in which the dispensing means comprises:

a. means responsive to the matching means for removing the processed item from the compartment; and
b. means for transporting the removed item to a position in which it may be extracted by a user.

12. An automated, human responsive apparatus for receiving, processing, storing, retrieving and dispensing an item which must be processed comprising:

a. means for providing instructions concerning processing of the item;
b. means for entering into the apparatus information responsive to the instructions provided;
c. means for receiving the item to be processed;
d. means for processing the item received;
e. means for storing the item processed;
f. means for retrieving the processed item stored; and
g. means for dispensing the processed item stored.

13. An apparatus according to claim 12 in which the item to be processed is a still video camera diskette.

14. An apparatus according to claim 13 in which the processing means comprises:

a. means for displaying an image derived from data obtained from the item; and
b. means for projecting the image onto light-sensitive paper.

15. An apparatus according to claim 12 further comprising means for recording the information entered.

16. A method for tracking an item which must be processed comprising:

a. recording information concerning an item to be processed on a mobile memory means located within an unmanned apparatus;
b. preparing an identifying means for the item bearing symbols derived from the information recorded;
transporting the mobile memory means, the identifying means, and the item to a processing facility;
d. processing the item; and
e. affixing symbols derived from the information recorded to the processed item.

17. A method for receiving, storing, processing, retrieving and dispensing an item which must be processed comprising:

a. prompting a patron to provide information relating to the patron's identity and the type of processing desired for the item to be processed;
b. recording the information provided on a memory means located within an unmanned apparatus;
c. preparing a first receptacle bearing symbols derived from the information recorded for the item to be processed and dispensing the first receptacle to the patron;
d. prompting the patron to deposit the item to be processed in the first receptacle;
e. accepting the first receptacle and storing it at a first location within the apparatus for collection;
f. collecting the first receptacle and transporting it to a second location for processing of the item received therein;
g. preparing a second receptacle for the processed item bearing symbols derived from the information provided;
h. transporting the second receptacle from the second location to the first location;
i. storing the second receptacle in any empty compartment of a compartmentalized storage means until retrieved by the patron; and
j. retrieving the second receptacle and dispensing it to the patron.

* * * * *